United States Patent [19]

Foust

[11] Patent Number: 4,762,276
[45] Date of Patent: Aug. 9, 1988

[54] FLUID EVAPORATION DEVICE FOR MUD PITS

[76] Inventor: H. Clyde Foust, 2728 Valentine Ct., New Orleans, La. 70114

[21] Appl. No.: 46,169

[22] Filed: May 5, 1987

Related U.S. Application Data

[63] Continuation-in-part of Ser. No. 813,608, Dec. 26, 1985, abandoned, which is a continuation-in-part of Ser. No. 656,244, Oct. 1, 1984, abandoned, which is a continuation-in-part of Ser. No. 355,895, Mar. 8, 1982, abandoned.

[51] Int. Cl.$^4$ ............................................. B05B 17/04
[52] U.S. Cl. .......................................... 239/8; 239/16; 239/23; 239/725; 261/120; 261/DIG. 79; 405/52; 405/128
[58] Field of Search ............................ 239/1, 8, 16-23, 239/469, 725; 261/120, DIG. 79; 210/197, 242.2; 175/66, 206; 405/52, 128

[56] References Cited

U.S. PATENT DOCUMENTS

| | | | |
|---|---|---|---|
| 1,945,328 | 1/1934 | Perkins | 239/8 |
| 2,794,674 | 6/1957 | Przystawik | 239/16 |
| 3,326,473 | 6/1967 | Wahlin | 239/469 |
| 3,622,074 | 11/1971 | Frohwerk | 239/23 |
| 3,785,558 | 1/1974 | Albritton et al. | 239/16 |
| 3,869,087 | 3/1975 | Erickson | 261/120 |
| 4,086,306 | 4/1978 | Yoshinaga | 261/120 |
| 4,133,850 | 1/1979 | Hauser | 261/120 |
| 4,449,849 | 5/1984 | Horn et al. | 405/128 |

FOREIGN PATENT DOCUMENTS 2157732   5/1973   Fed. Rep. of Germany ........ 239/17

Primary Examiner—Andres Kashnikow
Assistant Examiner—Michael J. Forman
Attorney, Agent, or Firm—James M. Pelton

[57] ABSTRACT

A device for increasing the evaporation of liquid from mud pits is disclosed having an elongated collection tank suspended from flotation means for holding a quantity of the liquid. A plurality of riser pipes extending from the collection tank to the surface of the liquid, each of the riser pipes having a nozzle connected to the end thereof capable of converting the liquid into a hollow, conical spray having ultrafine droplets.

9 Claims, 4 Drawing Sheets

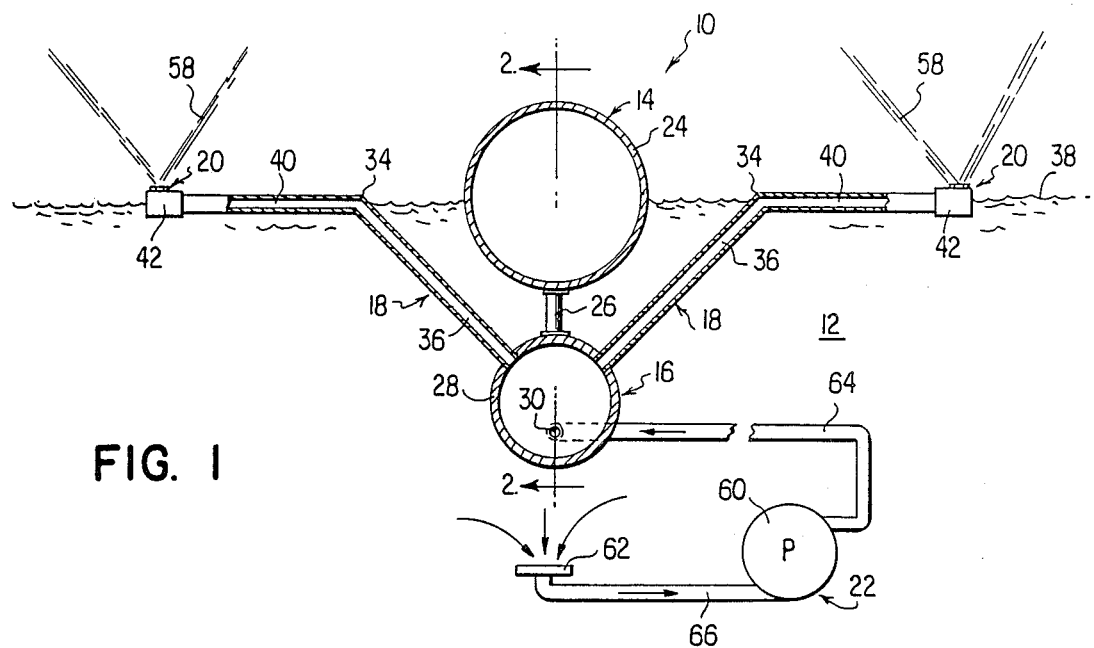
FIG. 1
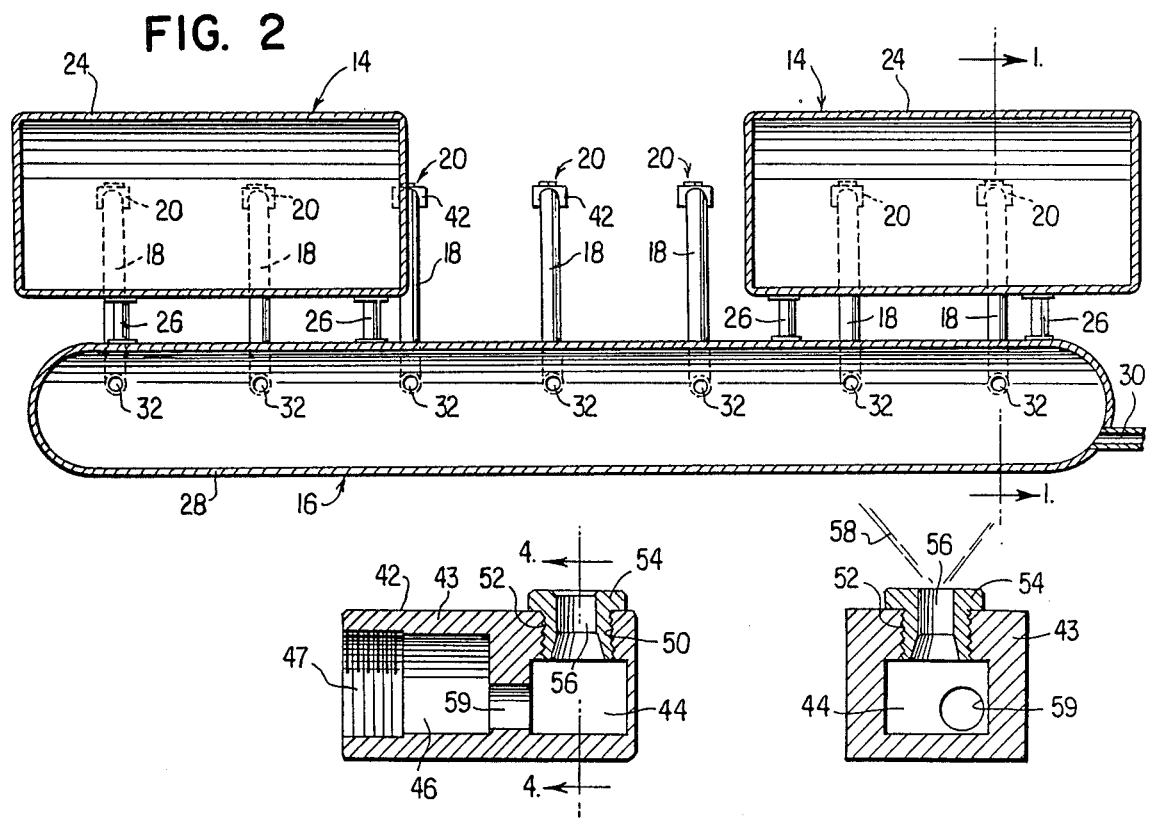
FIG. 2
FIG. 3
FIG. 4

4,762,276

FLUID EVAPORATION DEVICE FOR MUD PITS

CROSS-REFERENCE TO RELATED APPLICATIONS

This application is a continuation-in-part of Ser. No. 813,608, filed Dec. 26, 1985, now abandoned, which in turn is a continuation-in-part of Ser. No. 656,244, filed Oct. 1. 1984, now abandoned, which in turn is a continuation-in-part of Ser. No. 355,895, filed Mar. 8, 1982, now abandoned.

BACKGROUND OF THE INVENTION

This invention relates to fluid evaporation devices and more specifically to a device for increasing the evaporation of fluids contained in large pits associated with well drilling operations and the production of oil and gas. The pits are known as "mud pits" of the barrow-type having earthen sides and containing a large quantity of water, e.g., 100,000 gallons or more from sources such as rain, washdown and from drilling mud used to lubricate the well drill bits.

The pits are continuously filling up from the aforementioned sources necessitating the collected water being frequently disposed of. Heretofore, this disposal has been accomplished by several methods which have not proved satisfactory either because of the design limitations of the equipment utilized, the high cost to effectively disposed of each gallon of water, or both. One solution was to spray the water thirty to forty feet into the air in the hopes that the spray would be carried out of the area by the wind. This was found to be no more satisfactory than to transport the water to another location at a high cost and dump it on the ground.

Another solution of the prior art was to use a solid core nozzle to dispense the water into a sufficiently fine spray to get enough surface contact area exposed to the atmosphere to thereby increase evaporation. These solid core nozzles have not been found effective for a number of reasons, one of which is the poor contact area of the droplets formed which is available for drying and evaporation. There is a very high percentage of droplets formed in the spray from the type of nozzle that are large and concentrated in the center of the spray which do not evaporate and merely return to the surface of the water. In addition, the area between the core and the sides of the opening is small which results in frequent clogging, thus rendering the nozzle useless. In addition, this area is frequently enlarged due to the abrasive action of contaminants often found in the water which act on the surface of the core and the sides of the opening thereby substantially reducing the efficiency of the nozzle. Other constriction-type nozzles that produce a fine mist spray have also not proved satisfactory because the exposure of the mist droplets is limited by the outside area of the mist or fog envelope. These constriction-type envelopes also clog and wear out very rapidly.

Applicant has discovered that if a nozzle is used having a hollow core rather than a solid core, the droplet size distribution is more homogeneous for equal flow rates and pressure. The hollow core nozzle produces a spray cone having a hollow core or center of air which results from liquid rotation in the nozzle itself. The smaller, more homogeneous, droplets with their greater combined surface area for air contact result in a higher rate of evaporation. A typical hollow core-type nozzle is disclosed in U.S. Pat. No. 3,326,473, the contents of which is specifically incorporated herein by reference.

The use of a plurality of such hollow core nozzles in combination with the collection chamber and flotation members of the present invention result in a unique and novel device capable of floating on the surface of the water in a mud pit and effectively evaporate into the atmosphere large quantities of water pumped thereto. In addition, because the discharge orifice of the nozzle is open, i.e., does not have a solid core, it is not susceptible to rapid wear or clogging by the buildup of particulate matter in the water. The collection chamber serves as a header to help equalize the pressure of the fluid exiting the nozzle as well as a place where a large amount of the particulate matter in the water can settle out and not be forced through the nozzle orifices.

Previously used spray-forming devices having utilized submerged pumps as an integral part of the evaporation assembly. Submerged pumps have been found to be subject to frequent failure which necessitates the removal of the spray apparatus from the mud pit in order to repair the pump. Further, submerged pumps on floating spray devices are generally powered by electrically-driven motors. These motors, and the electrical leads thereto, often leak allowing the motor or the leads to fail because an electrical short occurs in the wet motor or power lead. Also, it is often difficult to supply electrical power to the mud pit site because of its location away from the drilling rig. In some of the embodiments of the present invention, a pump located on the ground adjacent the edge of the mud pit is utilized.

It is therefore the primary object of the present invention to provide a superior device for increasing the evaporation of liquid from mud pits.

It is another object of the present invention to provide a device for rapidly evaporating a liquid such as water utilizing hollow core spray nozzles for greatly enhancing the evaporation rate of liquid by increasing the area of contact between the liquid by increasing the area of contact between the liquid and atmosphere and without clogging the nozzle orifices.

It is yet another object of the present invention to provide a device which can be floated on and which can rise and fall with the liquid to be evaporated.

It is still another object of the present invention to provide a device which has a collection chamber for settling out and, thus, substantially reducing large particulate matter from exiting the nozzle orifices.

It is a further object of the present invention to provide a device for evaporating liquid which is very efficient, yet relatively inexpensive to construct, operate, and maintain, when compared to devices of the prior art.

It is also another object of the present invention to provide an evaporating device which utilizes a pump located on the ground adjacent the mud pit.

Other and further objects of the present invention will be apparent from the following description and claims, and are illustrated in the accompanying drawings, which, by way of illustration, show preferred embodiments of the present invention and the principles thereof, and what is now considered to be the best mode in which to apply these principles. Other embodiments of the invention embodying the same or equivalent principles may be used and structural changes may be made as desired by those skilled in the art without departure from the invention.

THE INVENTION

In accord with the foregoing objects, the present invention provides a device for evaporation liquid from a liquid-solid suspension in a drilling mud pit having a bottom, earthen sides and an open top comprising: (a) at least one sealed float chamber; (b) an elongated hollow cylindrical-shaped collector tank of substantially uniform diameter having two end walls and a side wall to equalize water pressure and settle particulate matter, said tank attached to and supported by said float chamber and having a plurality of outlets distributed along said side wall of said tank; (c) a riser pipe connected at one end to each of said outlets and extending both outwardly and upwardly from said collector tank and having the other end of said riser pipe extending above said liquid-solid suspension in said drilling mud pit; (d) a spray nozzle attached to said other end of each said riser pipe; (e) a separate pump having an inlet and an outlet located adjacent said mud pit; (f) inlet conduit means extending from said mud pit to said pump inlet; and (g) outlet conduit means extending from said pump outlet to said collector tank; said device being further characterized by having said outlets and said riser pipes with attached spray nozzles arranged in pairs, said pairs being positioned so that one of said spray nozzles is located directly above the other of said spray nozzles and wherein said spray nozzles have a hollow core spray tip and a chamber with a tangentially aligned inlet passage that produces a shallow conical spray when the pressurized suspension is ejected therefrom.

BRIEF DESCRIPTION OF THE DRAWINGS

FIG. 1 is a partical cross-sectional view of the first embodiment of the fluid evaporation device of the invention taken along the lines 1—1 of FIG. 2.

FIG. 2 is a cross-sectional view of the first embodiment of the fluid evaporation device of the invention taken along the lines 2—2 of FIG. 1.

FIG. 3 is a cross-sectional view of the nozzle used in the invention.

FIG. 4 is a cross-sectional view of the nozzle taken along lines 3—3 of FIG. 3.

DETAILED DESCRIPTION OF THE INVENTION

Figure 5:
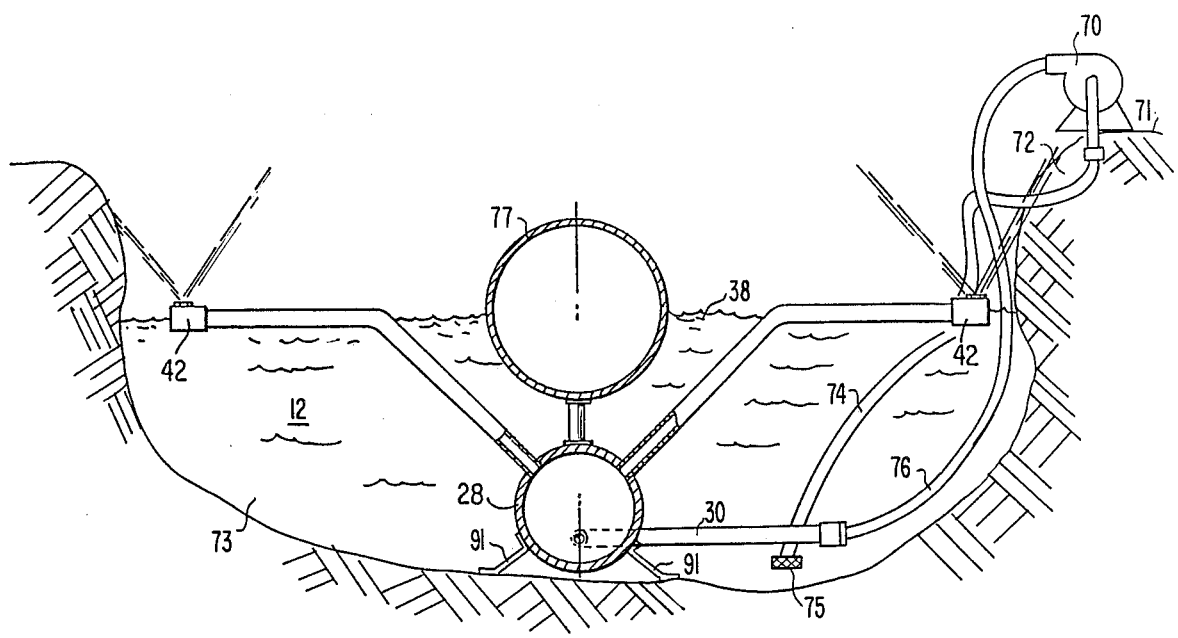
FIG. 5 is a partial cross-sectional view of a second embodiment of the fluid evaporation device of the present invention having the pump located on the ground adjacent the edge of the mud pit.

Referring now to the drawings, where like elements are identified by similar characters of reference in each of the several figures, numeral 10 depicts the fluid evaporation device of the present invention shown floating on a liquid 12 which is substantially water.

The evaporation device 10 is comprised of a float means 14, a collector means 16, riser means 18, nozzle means 20 and pump means 22. The float means 14 as illustrated can be made of any substance which is substantially unaffected by water or the minor contaminants contained therein and which can be formed to be positively buoyant. A pair of hollow sealed float cylinders 24 containing air are shown which can be made of metal, fiberglass or other suitable material. The buoyancy of the float means 14 is selected so as to maintain the nozzle means 20 at or near the surface of the liquid 12. A single hollow float cylinder could also be used or a buoyant structure made of wood.

The collector means 16 is suspended beneath the float means 14 by arms 26 located between the collector means 16 and the float means 14 and attached thereto. The collector means 16 is a hollow cylindrical-shaped collector tank 28 also made of metal, fiberglass or other suitable, non-corrodible material. The collector tank 28 has an inlet pipe 30 connected at one end thereof through which the liquid to be evaporated is fed as will be more fully described alter. The collector tank 28 also has a plurality of holes 32 through the wall thereof to which are connected riser means 18. The collector tank 28 acts as a large reservoir for ensuring the substantial equalization of pressure of the water exiting each of the holes 32.

The riser means 18 is a plurality of riser pipes 34 having a first pipe section 36, one end of which is attached to the collector tank 28 in communication with the holes 32. The first pipe section 36 of riser pipe 34 extends from the collector tank 28 to the surface 38 of the water 12 at an angle with respect thereto and is joined at the other end thereof by a second section 40. The second pipe section 40 extends a distance parallel to the surface 38 of the water 12 and has an end adapted to accommodate attachment of the nozzle means 20 as can best be seen by referring to FIG. 1.

As best seen in FIGS. 3 and 4, nozzle means 20 is a type of fluid nozzle 42 capable of producing a hollow cone spray and has a housing 43 with a chamber 44 located between the nozzle inlet 46 and nozzle outlet 48. The inlet 46 has threads 47 for connection to the end of the second pipe section 40 of the riser means 18 and threads 50 for accommodating the threaded end 52 of the spray tip 54. The spray tip 54 has a hollow cylindrical axial core or orifice 56 in communication with the chamber 44 for discharging the water passing through the chamber 44 into the atmosphere. The water exits orifice 56 vertically and is in the form of a hollow, cone-shaped spray 58 consisting of extremely fine droplets of water resembling a fog. This fine spray 58 is achieved by introducing the water tangentially into the chamber 44 in the form of a high velocity jet stream through passage 59 such that it whirls within the chamber 44 before exiting orifice 56 as is more fully described in the aforementioned patent.

The water 12 is fed to the inlet pipe 30 of the collector tank 28, through the collector tank 28, riser pipes 34 and out nozzles 42 by pump means 22 consisting of a suction pump 60 connected between the inlet pipe 30 and a screened or grated opening 62 located beneath the surface of the water 12 by pipes 64, 66. Collector tank 28 also provides an area where particulate matter can settle out of the water to thereby eliminate or at least substantially reduce wearing and enlargement of the surfaces of the nozzle 42 and in particular, orifice 56 thereof. As aforementioned, by breaking down the water 12 into minute, fog-like droplets 58, the surface area of a given quantity of water is enormously increased. Because this spray is in the shape of a hollow cone, air can come in contact with more of the droplet surface area to thereby evaporate same in quantities heretofore unrealizable by the use of previously mentioned nozzles or other means of the prior art given by the same surface tension and temperature of the water and relative humidity and temperature of the surrounding air.

When the evaporation device 10 of the present invention is used to evaporate water from a mud pit wherein the water level would tend to rise during the period when drilling operations were in progress and fall when they have stopped and the water is being evaporated thereby, the float cylinder 24 would be anchored or tethered so as to rise and fall with the water level such that the nozzle orifices 56 are above the water level. The device is provided with a plurality of feet 91 that extend downwardly and outwardly from the sides of the collector tank 28. These feet rest on the bottom of the mud pit when the water level in the mud pit is sufficiently low for the collector tank 28 to rest on the bottom of the mud pit and prevent tipping of the device.

Referring now to FIG. 5, a second embodiment of the fluid evaporation device of the present invention utilizes a pump 70 that is located on the ground 71 adjacent the edge 72 of the mud pit 73. The pump 70 may be a centrifugal pump or a reciprocating pump and powered by an electrical motor (not shown) or other suitable power source, e.g., internal combustion engine. The pump 70 has its suction inlet connected to a flexible hose 74 that extends into the mud pit 73 and has a filter 75 on its end. The filter may be a screen with suitable size mesh openings to prevent drill bit cuttings or other solid objects from entering the suction line. Alternatively, the filter may be located at the pump inlet for easy cleaning. The pump has a flexible hose 76 connected to its discharge outlet with the other end of the hose connected to the inlet pipe 30 of the collector tank 28. If desired, the pump inlet may also be connected to a flexible conduit with a floating filter (not shown) on the surface 38 of the water 12. If desired, both conduits to the pump may be rigid pipe. By using a pump that is located on the ground adjacent the mud pit, a more economical pump can be used. Also, the pump can be repaired or replaced much faster and more economically than is the case when a submerged pump is used to supply liquid from the mud pit to the evaporation device. The evaporation device 10 is of substantially the same construction as that shown and described hereinbefore other than the replacement of the submerged pump with a freestanding pump on the ground adjacent the mud pit.

Figure 6:
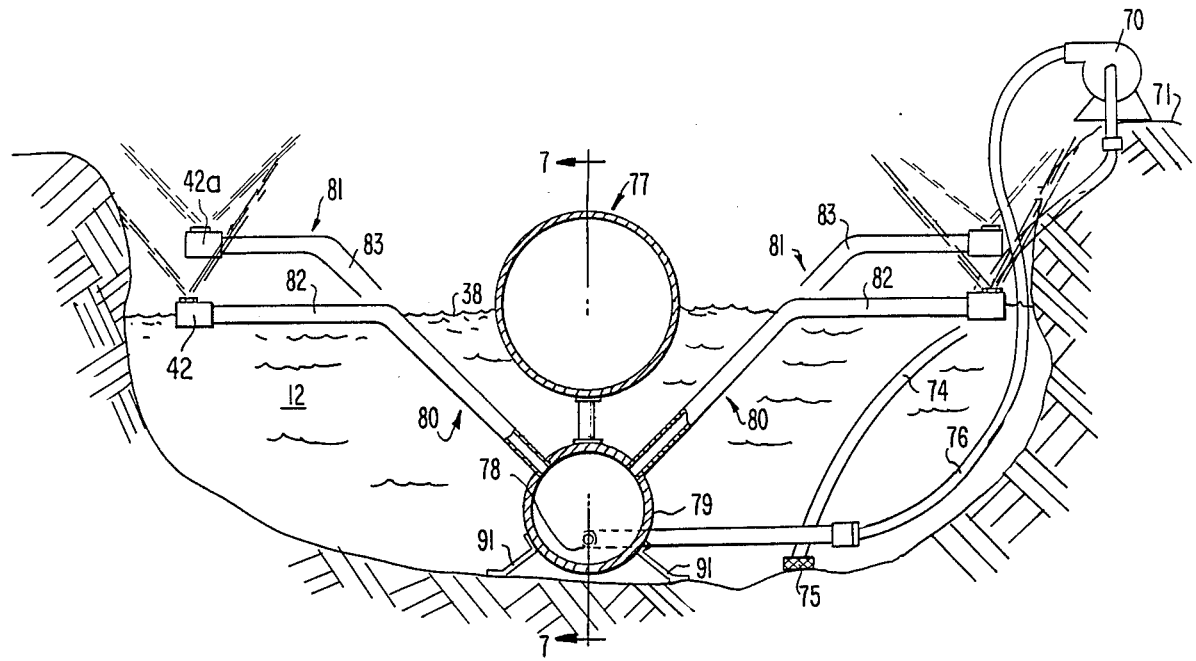
FIG. 6 is a partial cross-sectional view of a third embodiment of the fluid evaporation device of the present invention.
Figure 7:
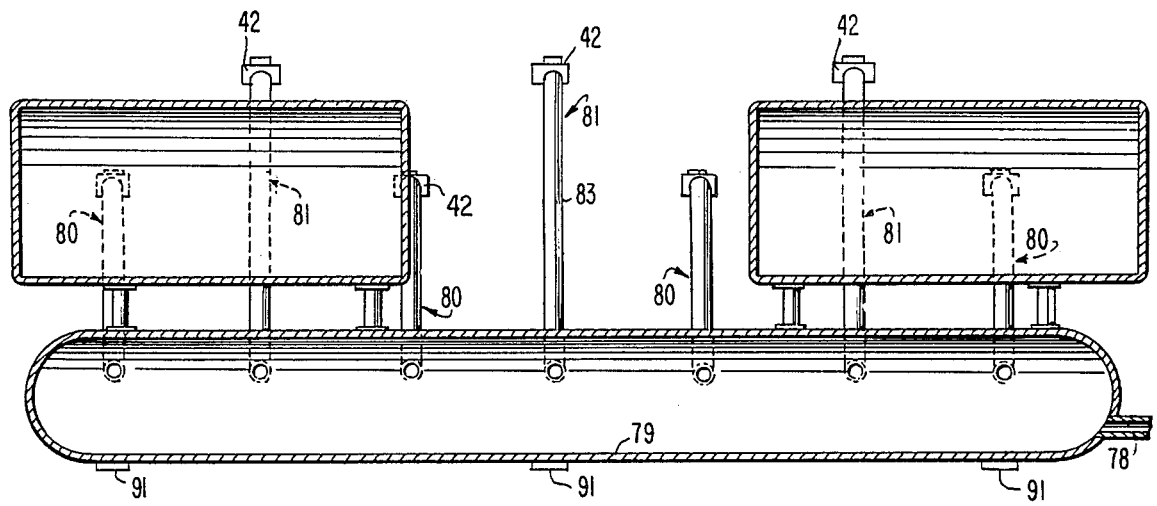
FIG. 7 is a cross-sectional view of the fluid evaporation device taken along the lines 7—7 of FIG. 6.

Referring now to FIGS. 6 and 7, a third embodiment of the fluid evaporation device of the present invention is shown. This arrangement also has the external pump 70 located on the ground 71. The external pump 70 is connected to the evaporation device 77 by flexible hose 76 which has its lower end attached to inlet pipe 78 located at one end of collector tank 79. Spaced along each side of the collection tank 79 are a plurality of alternating first riser means 80 and second riser means 81. The first riser means 80 is constructed the same as the riser means 18 shown in FIGS. 1 and 2, i.e., it has a second pipe section 82 that is parallel to and located at the surface 38 of the water 12 with the nozzle 42 at the surface also. The alternating second riser means 81 has an elongated first pipe section 83 that extends well above the surface 38 of the water 12 so that the nozzle 42a at its terminal end is positioned well above the surface 28 of the water 12. The spacing between the first riser means 80, the second riser means 81, and the length of first pipe section of each of the riser means is so adjusted that the adjacent cone sprays do not interfere with each other. By alternating high and low positions for adjacent nozzles, it is possible to increase the number of riser pipes that can be located on each side of the collector tank 79, thus increasing the amount of water evaporated by the evaporation device.

Figure 8:
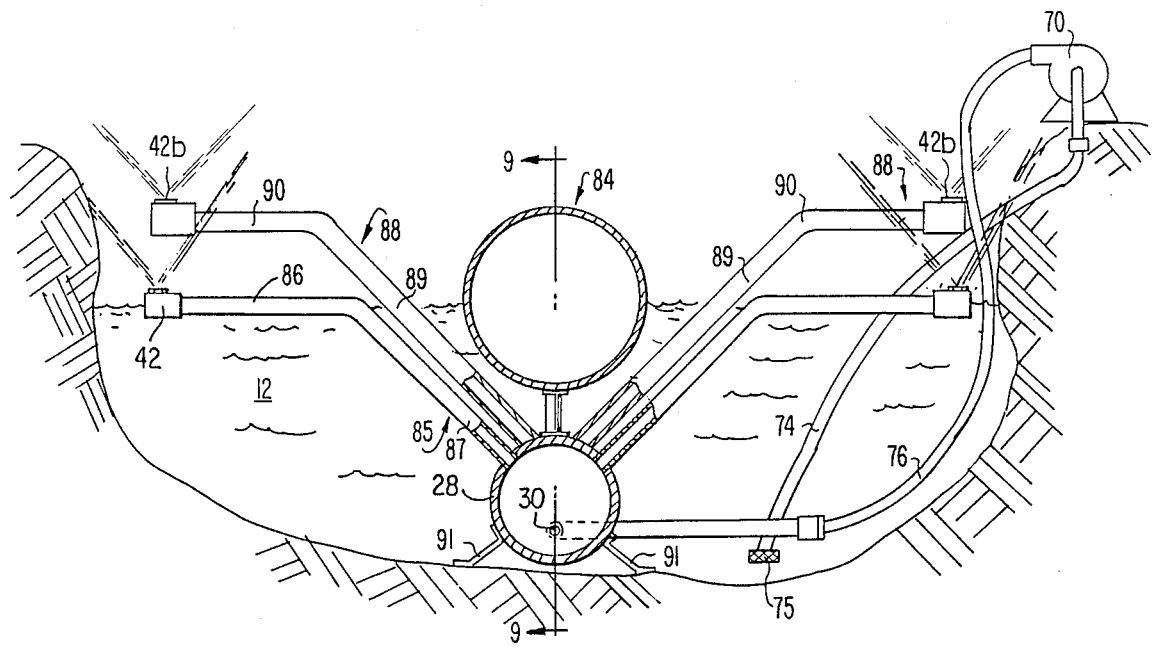
FIG. 8 is a partial cross-sectional view of a fourth embodiment of the fluid evaporation device of the present invention.
Figure 9:
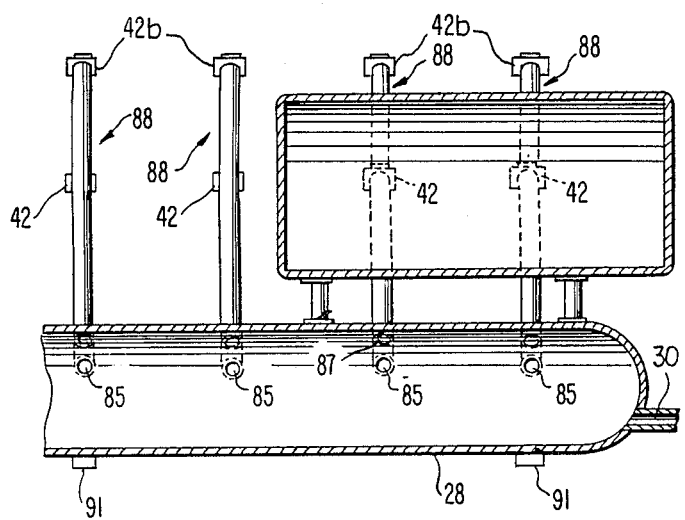
FIG. 9 is a cross-sectional view of fluid evaporation device of the present invention taken along line 9—9 of FIG. 8.

Referrng now to FIGS. 8 and 9, there is shown a fourth embodiment of the evaporation device 84 of the present invention. The external pump 70 sits on the ground 71 and is connected to the inlet tank 30 by flexible outlet line 76 and has a flexible suction line 74 connected to the pump inlet. Extending upward from the collector tank 28 is a first riser means 85 that has an upper section 86 that is located on the surface 38 of the water 12. A spray nozzle is connected to the upper or outer end of pipe section 86. As seen in FIG. 9, the first riser means 85 has a lower pipe section 87 that is attached to the collector tank 28 at its lower end. A second pipe section 90 extends horizontally from the first pipe section 89 and has a spray nozzle 42b mounted thereon. The first riser means 85 is mounted below, and parallel with the second riser means 88. As seen in FIG. 8, by mounting the first riser means 88 above the second riser means, the conical spray from the nozzle 42 of the lower first riser means 85 does not interfere with the conical spray from the nozzle 42b on second riser means. By positioning a second conical spray above and in line with the first conical spray, this embodiment is able to evaporate considerably more water 12 from the mud pit than the first embodiment. Further, it does not require lengthening the collector tank to add additional spray nozzles. Another feature of this embodiment is the increased upward air flow produced by locating the second spray nozzle 42b directly above the lower spray nozzle 42. If desired, another spray nozzle can be mounted above the second spray nozzle 42b by adding additional riser means to position the third spray nozzle above the second spray nozzle 42b.

In tests conducted with an evaporation apparatus constructed in accordance with FIGS. 1 and 2 with the pump previously described, a fluid spray height of approximately 15 to 20 feet was developed. In tests with apparatus constructed in accordance with FIGS. 8 and 9, i.e., with pairs of nozzles having one nozzle located above the other, a fluid spray height of 30 to 40 feet was developed. Thus, it is seen that the apparatus using vertically arranged pairs of nozzles develops more air velocity, thus increasing the height of the spray and enhancing the evaporation rate of the fluids from the mud pits.

A number of tests were conducted using evaporator apparatus constructed in accordance with the embodiments of the invention shown in FIGS. 8 and 9. These tests utilized an evaporator having 26 spray nozzles in pairs with one nozzle mounted above the other on each of the side portions of the collector tank. A centrifugal pump with a maximum capacity of 1,200 gal/min was used which provided a flow rate of approximately 593 gal/min through the evaporator. Normal operating pressure was 75 psi. At this pressure and flow rate, the spray from the apparatus for fluid supplied to the evaporator extends approximately 40 feet above the mud pit fluid surface.

In one test made on an oil well mud pit in north Louisiana, the evaporator device was operated for a total of 97 hours during which time approximately 1,648 barrels of fluid were evaporated from the mud pit for an average of 17 barrels per hour. The mud pit level was lowered 9.75 inches in this time period.

Another test was conducted at an oil well mud pit in south Louisiana using the same evaporator apparatus as in the above tests. The mud pit volume was 452 barrels/inch. In one 24-hour test, the mud pit was lowered ⅞ inch which indicated that a total volume of 393 barrels was evaporated in 24 hours, i.e., approximately 16 barrels/hour. A second set of measurements was made on this test site a few days later. In a 69-hour test period, the mud pit level was lowered 2⅛ inches indicating that approximately 960 barrels of fluid were evaporated in this time period, i.e., 334 barrels/day or 14 barrels/hour.

Based on the above tests, the evaporator used has an "efficiency" of approximately 3.0% ("efficiency" = amount of fluid evaporated/amount of fluid pumped through apparatus). The above tests indicate that the evaporator apparatus employed can evaporate fluids from an oil well mud pit at a cost of approximately 25 cents/barrel. Costs involved in hauling fluids by tank truck to an approved waste disposal site from the first test location above was approximately 3 dollars/barrel. Thus, it can be seen that the present invention provides a very economical method and apparatus for the safe disposal of liquids from oil and gas well drilling mud pits.

The evaporation device of the present invention permits use of smaller mud pits at the well site. By continuously evaporating liquid from the mud pit, the water level can be held relatively constant even though water is added to the mud pit from the drilling operations, i.e., waste drilling mud, wash down water, rain water, etc. By continuing evaporation of water from a mud pit after the well is completed, or after the hole is abandoned, it is possible to reduce the liquid in the mud pit to a sufficiently low level that will permit the pit to be filled with dirt, thus allowing the land to be reused.

I claim:

1. A device for evaporating liquid from a liquid-solid suspension in a drilling mud pit having a bottom, earthen sides and an open top comprising:
   (a) at least one sealed float chamber;
   (b) an elongated hollow cylindrical-shaped collector tank of substantially uniform diameter having two end walls and a side wall to equalize water pressure and settle particulate matter, said tank attached to and supported by said float chamber and having a plurality of outlets distributed along said side wall of said tank;
   (c) a riser pipe connected at one end to each of said outlets and extending both outwardly and upwardly from said collector tank and having the other end of said riser pipe extending above said liquid-solid suspension in said drilling mud pit;
   (d) a spray nozzle attached to said other end of each said riser pipe, said spray nozzle having a hollow core tip and a chamber with a tangentially aligned inlet passage that produces a shallow conical spray when the pressurized suspension is ejected therefrom;
   (e) a separate pump having an inlet and an outlet located adjacent said mud pit;
   (f) inlet conduit means extending from said mud pit to said pump inlet; and
   (g) outlet conduit means extending from said pump outlet to said collector tank;

said device being further characterized by having said outlets and said riser pipes with attached spray nozzles arranged in pairs, said pairs being positioned so that one of said spray nozzles is located directly above the other of said spray nozzles.

2. The device of claim 1 wherein said plurality of said outlets and riser pipes are aligned in two parallel rows, one row being on each side wall of said tank and said nozzles are spaced horizontally away from said float chamber.

3. The device of claim 1 wherein said collector tank is provided with a plurality of feet adapted to maintain said device upright when said device is resting on said bottom of said mud pit.

4. The device of claim 1 capable of producing a spray pattern having a height of approximately from about 30 to about 40 feet.

5. The device of claim 1 which has a fluid evaporation efficiency of up to 3.9%, determined by dividing the volume of fluid evaporated per unit time by the volume of fluid pumped through said device per unit time.

6. A method for evaporating liquid from a liquid-solid suspension contained in a drilling mud pit having a bottom, earthen sides and an open top comprising the steps of:
   (a) placing a device of claim 1 in said mud pit with the spray nozzles of said device extending above said liquid-solid suspension;
   (b) locating said pump having said inlet and said outlet on the ground adjacent said mud pit;
   (c) connecting a fluid conduit from the outlet of said pump to said collector tank and a fluid conduit from the inlet of said pump to said liquid-solid suspension in said mud pit; and
   (d) supplying power to said pump to force said liquid-solid suspension through each of said spray nozzles so that a series of conical sprays on each side of said collector tank is produced to evaporate liquid from said liquid-solid suspension.

7. The method of claim 6 including the step of arranging said outlets on each side of said collector tank whereby said riser pipe and spray nozzle attached to each of said outlets form single, substantially parallel rows.

8. The method of claim 6 including the step of arranging said outlets on each side of said collector tank whereby said riser pipe and spray nozzle attached to each of said outlets form double, substantially parallel rows.

9. The method of claim 6 including the step of projecting the spray produced by said spray nozzles to a height of from about 30 to about 40 feet above the surface of the liquid-solid suspension in said mud pit.

* * * * *